Jan. 24, 1933.　　W. H. KNOWLES　　1,895,225
CAPPING AND SEALING MACHINE
Filed Feb. 14, 1925　　4 Sheets-Sheet 1

Jan. 24, 1933.  W. H. KNOWLES  1,895,225
CAPPING AND SEALING MACHINE
Filed Feb. 14, 1925  4 Sheets-Sheet 2

INVENTOR
William H. Knowles
BY
Mayer, Warfield & Watson
ATTORNEY

Jan. 24, 1933.  W. H. KNOWLES  1,895,225
CAPPING AND SEALING MACHINE
Filed Feb. 14, 1925  4 Sheets-Sheet 3

INVENTOR
William H. Knowles
BY
Mayer, Warfield & Watson
ATTORNEY

Jan. 24, 1933. W. H. KNOWLES 1,895,225
CAPPING AND SEALING MACHINE
Filed Feb. 14, 1925 4 Sheets-Sheet 4

INVENTOR
William H. Knowles
BY
Mayer, Warfield & Watson
ATTORNEY

Patented Jan. 24, 1933

1,895,225

UNITED STATES PATENT OFFICE

WILLIAM H. KNOWLES, OF PORT CHESTER, NEW YORK, ASSIGNOR, BY MESNE ASSIGNMENTS, TO GENERAL CAP CO. INC., OF NEW YORK, N. Y., A CORPORATION OF DELAWARE

CAPPING AND SEALING MACHINE

Application filed February 14, 1925. Serial No. 9,128.

This invention relates to an improved type of machine adapted for use in connection with the capping and sealing of receptacles, particularly of the milk bottle type.

It is an object of the invention to provide a device of the character stated which will seal a receptacle in such a manner that access may not be had to the interior of the same without this fact being readily apparent.

A further object is that of furnishing a machine which, although capable of general application, is particularly adapted for use with closures and sealing members of that type particularly illustrated in my copending application, Serial No. 735,081, filed August 30, 1924.

A still further object is that of furnishing a machine which when used in connection with a closure of this type will apply the same to a receptacle so as to prevent an escape of fluid from within the latter, and which will simultaneously lock the closure member upon the receptacle body.

Another object is that of constructing a machine which will operate in such a manner that caps or other closure members may be used to seal receptacles which vary in size without injury to the receptacles or any variation in uniformity of the manner of the sealing.

An additional object is that of providing a machine which will efficiently perform the purposes for which it is intended, and which will also be economically and readily manufactured and easily assembled.

Other objects of the invention will in part be obvious and will in part appear hereinafter.

The invention accordingly comprises the features of construction, combination of elements, and arrangement of parts which will be exemplified in the construction hereinafter set forth, and the scope of the application of which will be indicated in the claims.

For a fuller understanding of the nature and objects of the invention reference should be had to the following detailed description taken in connection with the accompanying drawings, in which.

Figure 1:
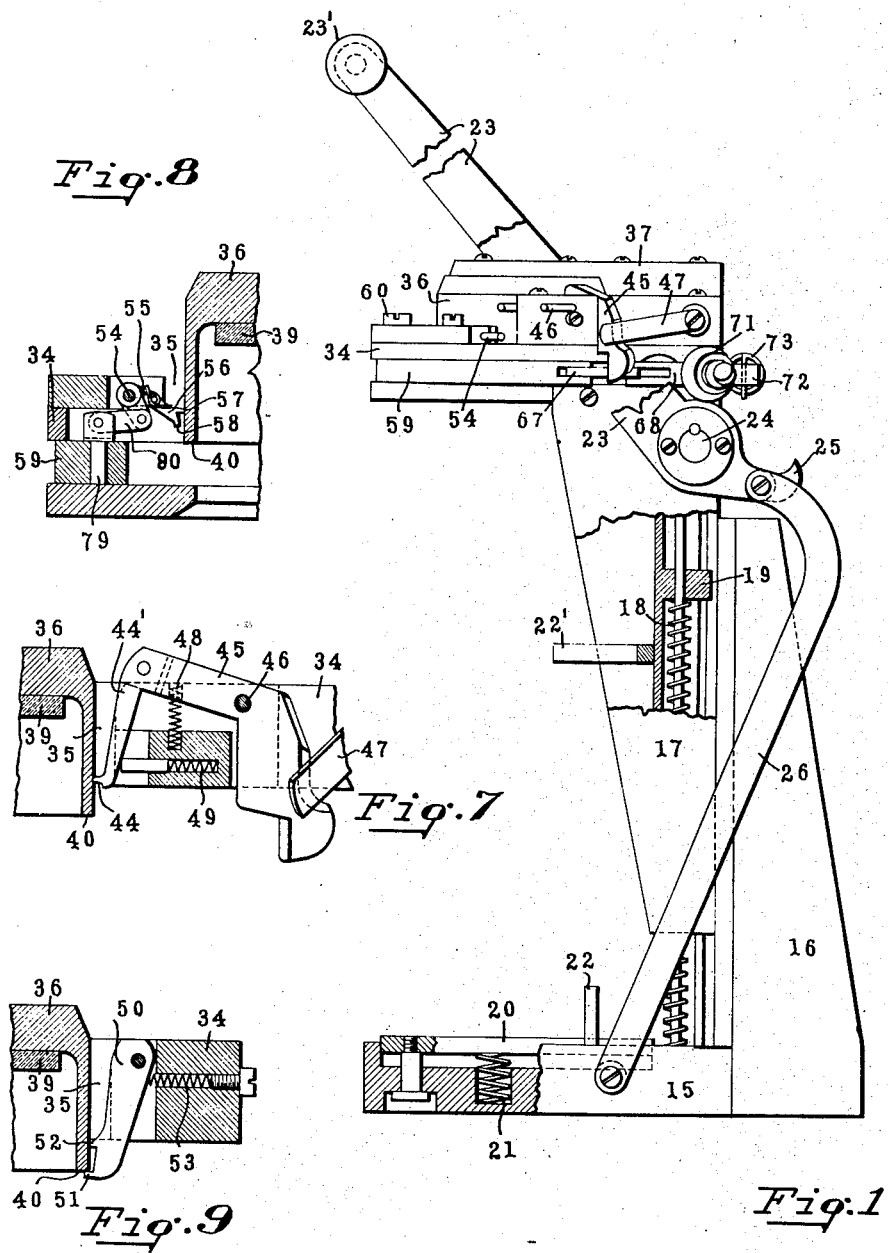
Fig. 1 is a partly sectional side elevation of one form of machine embodying the improved construction of the present invention.
Figure 2:
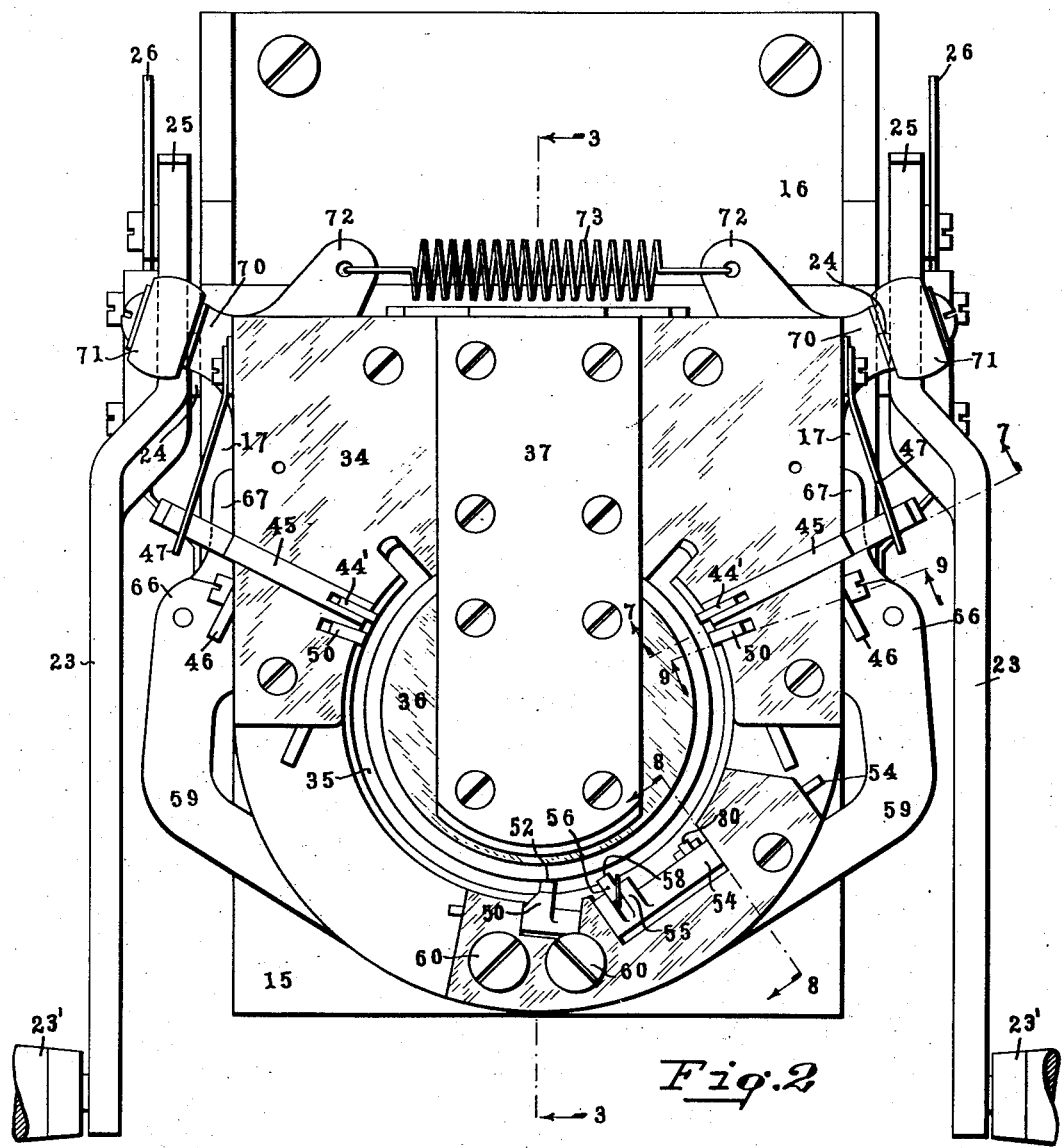
Fig. 2 is a top plan view of the machine as shown in Fig. 1.
Figure 10:
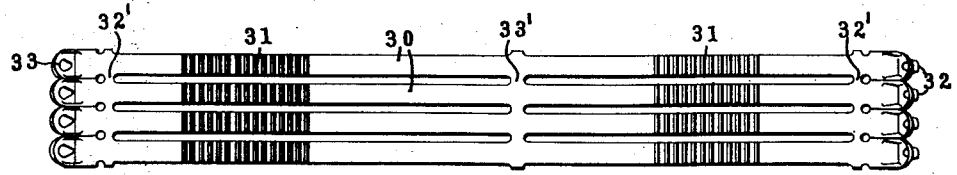
Figure 12:
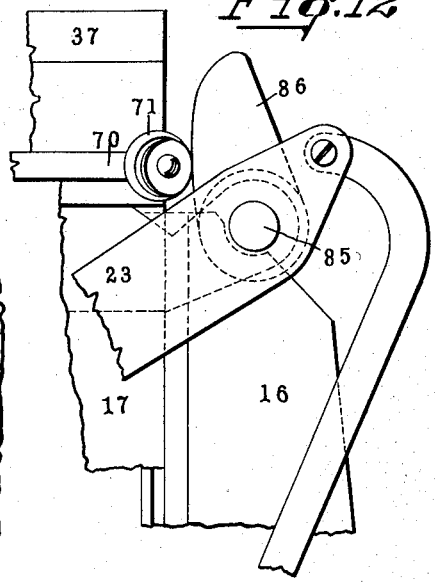
Figure 11:
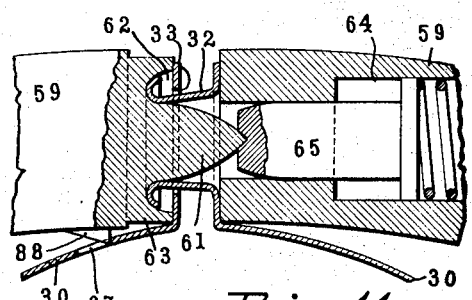

Figs. 7, 8 and 9 are fragmentary sectional views taken along the lines 7—7, 8—8 and 9—9, respectively, and in the direction of the arrows in Fig. 2;

Fig. 10 is a flattened view of a group of sealing bands;

Fig. 11 is a partly sectional fragmentary view of the band-constricting members shown in association with the ends of the band; and Fig. 12 is a fragmentary view, showing an alternative form of construction which may be used to advantage in certain instances.

As aforestated, the illustrated embodiment has been confined to a showing of a machine particularly adapted for use in connection with caps and sealing members of the nature illustrated in the previous application. However, it will be appreciated that the machine may be utilized to advantage with caps or sealing members of different types, and that the invention lends itself for use in the sealing of receptacles other than milk bottles.

Thus, it will be noted that the numeral 15 indicates the base of the machine, which is associated with a standard 16, the latter being constructed to slidably support a carriage 17, which is normally urged away from the base 15, in the present instance, by utilizing springs 18 interposed between the upper face of the base, and lugs 19 forming a part of the carriage 17. If desired, the base may be provided with a platform 20, which is normally urged upwardly by springs 21 so as to yieldingly support a receptacle.

It may be desirable to incorporate a structure in the machine which will provide a guide for the centralizing of a bottle with the machine head, which will be hereinafter described. With this in mind, in the present instance, a pair of spaced pins 22 is associated with the base 15, one to each side of the platform 20 and properly correlated with respect thereto. As a consequence, it will be obvious that if a receptacle is pushed inwardly upon the base, and this receptacle is of a certain predetermined size, its outer face or faces will reach a position at which they will bear against the pins 22, thus properly positioning the receptacle with respect to the machine. If, on the other hand, no platform is incorporated in the machine, or if it is not desired to employ the pins, it is quite obvious that a yoke-member 22' may be associated with the carriage 17 and act as a spacing and guiding member, it being understood that its arms will extend one to each side of a receptacle to accomplish the desired results.

Supported at the upper end of the carriage 17 is an operating head, by means of which in the present instance the cap is pressed into sealing contact with the receptacle mouth, and is locked in position upon the receptacle. The space between the upper face of the platform 20 and the under face of the head is, of course, normally greater than the height of the receptacle which is to be operated upon. In order to move the head into operating position, as well as to actuate the mechanism incorporated therein, it will be noted that in the present instance a pair of hand-actuated operating members are employed. Each of these members includes an arm 23 pivotally secured, as at 24, to the head, and extended beyond this point of pivotal attachment, as at 25 in Figs. 1 to 11, in the form of hook-shaped cam portions. At points short of the ends of these portions the upper ends of links 26 are pivotally attached, the opposite ends of these links being similarly secured to the base 15.

As a consequence, if handles 23' are associated one with each of the arms 23 it will be appreciated that an operator may grasp these members and swing the arms downwardly around their pivots 24. This action will result in the extensions 25 being moved upwardly, and, due to the provision of the links 26, the head will obviously be moved towards the base 15, this action being permitted incident to the slidable connection extant between the carriage 17 and standard 16. During such depression of the head it is obvious that the springs 18 will be compressed, so that upon the handles being released the parts will tend to resume their normal position, i. e., that illustrated in Figs. 1 to 4.

Figure 3:
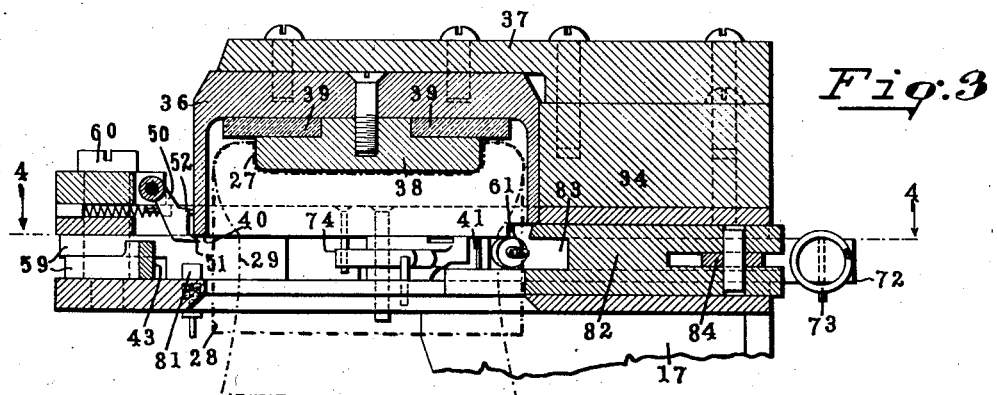
Fig. 3 is an enlarged sectional side view of the capping and sealing head as shown in Fig. 1, and taken along the line 3—3 and in the direction of the arrows in Fig. 2.

With reference to the capping and sealing members utilized, as well as the type of receptacle which is preferably acted upon, it will be understood, as has been indicated in dotted lines in Fig. 3, that the cap preferably includes a body having a stopper portion 27 and a hood or skirt 28, while the receptacle, if in the nature of a milk bottle, embraces a neck 29, around which the skirt 28 is disposed,—the body of the cap extending around the pouring lip of the bottle, and the stopper portion 27 of the former extending into the mouth of the latter. A number of sealing members, as in Fig. 10, are grouped together to provide what might be termed a locking unit, and each of these members includes a band-like body 30, preferably having corrugated portions 31, its ends extending at angles to its body, and one of these ends presenting a locking-stud or collar 32 adapted to be extended through an opening 33 in the opposite ends of the band and subsequently bent to project at an angle to the axis of this opening, so that the band ends may be locked.

It will be appreciated that for the sake of clear illustration the band unit, as in Fig. 10, has been flattened out. In commercial practice this unit is preferably shipped with its body transversely curved, i, e., in a condition in which the bands are lengthwise curved and extend in an arc having a diameter slightly greater than the diameter of the lip of the bottle so that the bands may be freely moved downwardly past this lip. Finally, with reference to the locking unit, it will be observed that the individual bands are separated from each other throughout the major portions of their lengths, but that in the present instance points of connection between the bands are afforded adjacent each offset end portion, as at 32', and at a point substantially intermediate these end portions, as at 33'. Thus, all of the bands of the locking unit will form an integral part of one another, and, consequently a member will be presented which may readily be manipulated and handled without fear of disarrangement or loss of the individual bands.

Figure 4:
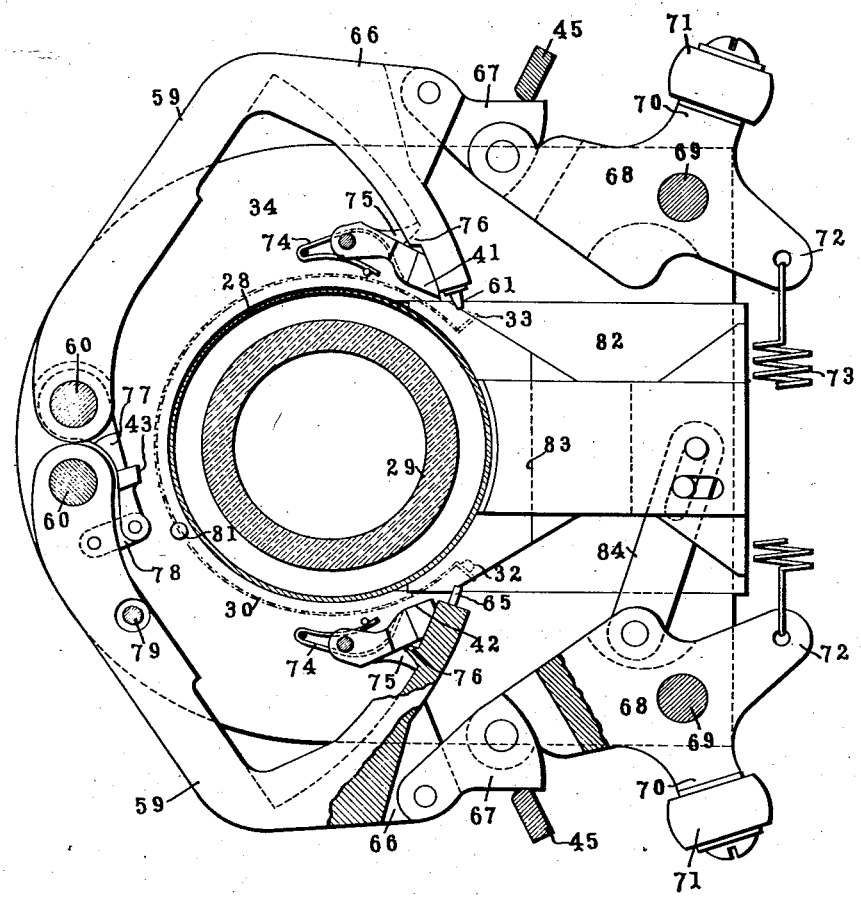
Fig. 4 is a sectional plan view taken along the lines 4—4 in the direction of the arrows in Fig. 3.

The head of the machine, as in Figs. 2, 3 and 4, includes a plate assembly 34 formed with a central opening of ample size and proper configuration to permit of the passage of the band bodies and their offset end portions. Extending into this opening is a cup 36, which may be suitably supported by an arm 37, the diameter of this cup being sufficiently small to be readily accommodated within the opening in the plate 34 so as to provide a slot 35 extending through the machine head. Within the cup 36 is a plug 38, which is adapted to be extended into the mouth of a receptacle, and which, if desired, may be cushioned, as at 39. Thus, it will be obvious that when the head is lowered the cup will assume a position such as that illustrated in Fig. 3, and in such position the plug 38 will engage with the stopper portion 27 of the cap in order to firmly press the same into the receptacle mouth.

The wall of the cup 36 may be extended to a point below the pouring lip of the receptacle and has a shearing edge or edges 40 adapted to cooperate with knives 41, 42 and 43. The first two of these knives are arranged at points adjacent which the connecting portions 32' of the band unit will rest, and the knife 43 is disposed at a position adjacent the connecting portion 33'. It is thus obvious that if the lowermost band of the unit extends below the shearing edge of the cup, and if these knives are moved in a manner hereinafter brought out, the portions 32' and 33' will be severed to detach this band.

With a view to feeding the band unit downwardly through the sealing machine, and also retaining the same in proper position relatively to the mechanism thereof, it will be noted in the present instance that the head of the machine carries a series of feeding and retaining pawls. Two groups of these pawls are arranged one adjacent each of the knives, as has been best illustrated in Fig. 2. Each of these groups, as in Figs. 7 and 9, embraces in the present instance a pawl member 44, which forms a part of an arm 44', the latter being pivotally secured to a lever 45, which is swingingly mounted, as at 46, upon the head of the machine. The outer end of this lever is acted upon by a spring 47, and supplemental springs 48 and 49 may cooperate with the lever and arm in order to tend to normally swing the inner end of the former upwardly to the position illustrated in Fig. 7, and the pawl end 44 of the latter inwardly into contact with the outer face of the cup 36. Also, included in each of these groups is a second pawl member, which, as in Fig. 9, may simply embrace a swinging arm 50 presenting a pair of pawl portions 51 and 52, and spring-pressed, as at 53, so that these pawl portions also tend to move into contact with the outer face of the cup. It is thus obvious that, if the pawls 44 extend into the space extant between individual bands 30, and these pawls are moved downwardly, the band unit will also be fed downwardly. After such feeding has been completed the band unit will be prevented from rising incident to the provision of the pawl members carried by the arms 50, it being understood that the upper edge of that band which extends below the cup 36 is engaged by the members 51. A further part of the feeding mechanism is adapted to cooperate with the band unit at a point substantially intermediate the side edges thereof, and the detailed construction of this portion of the mechanism has been shown to best advantage in Figs. 2, 3 and 8. In these views it will be observed that the head carries a shaft 54, between extensions 55 of which a spring-pressed arm 56 is rockingly supported, and this arm terminates in a pair of pawl portions 57 and 58,—the former serving to retain the band unit against displacement, while by means of the latter the band unit may be fed downwardly upon the shaft being rocked. A further pawl member corresponding to that shown in detail in Fig. 9 is positioned adjacent the pawl members 57, 58, as has been illustrated particularly in Fig. 2, and thus it will be understood that any tendency of the bands to move upwardly at a point intermediate the side edges of the unit will be prevented incident to this construction.

With reference to the band-constricting and fastening mechanism it will be observed—particularly as in Fig. 4—that two hook-shaped arms 59 are pivotally attached, as at 60, to the head of the machine. One of these arms, as in Fig. 11, terminates in a stud 61, and the arm adjacent the base of this element is recessed to provide an annular groove 62,—the arm carrying these members being reduced, as at 63, adjacent its outer end. The second arm is formed with a bore 64 adjacent its outer end, and this bore accommodates a spring-pressed pin 65, the outer end of which is formed with a recess suitable for the accommodation of the tip of the stud 61. When these arms are in the positions illustrated particularly in Figs. 4 and 5 the pin and stud will both project beyond their outer ends, and, consequently, be in a position to extend one through the opening 33 in a band end, and the other through the bore of the collar 32. Thus, upon the arms being swung towards each other these elements will enter these openings and draw the band ends together, finally resulting in the collar 32 moving through the opening 33, as in Fig. 11, and the free edge of the former being bent at an angle to the opening of the latter so as to prevent other than a forcible detachment and consequent mutilation of the parts.

With a view to providing actuating mechanism for the several elements aforedescribed it will be observed that in the present instance the bodies of the arms 59 are out-struck, as at 66, and are pivotally attached to the ends of links 67; the opposite ends of these links are similarly attached to actuating members 68, which are pivotally mounted upon the head, as at 69. Each of these actuating members has an arm 70 carrying a rotatable roller 71, and also an arm 72. A spring 73 is interposed between the latter arms of the actuating members and is attached thereto, so that by means of this spring the parts are normally retained in the position illustrated in Fig. 4, but by virtue of the rollers 71 and the hook-shaped cam portions 25 the actuating members 68 may be swung through the position shown in Fig. 5 to the position illustrated in Fig. 6. In such movement it will be obvious that the ends of the band will be engaged by the free ends of the arms 59 and drawn towards, and anchored to, each other. At the beginning of this movement the knives 41, 42 will occupy the position shown in Fig. 4 by virtue of the fact that they are normally retracted by means of springs 74, and, furthermore, for the reason that they will be positively withdrawn incident to extensions 75 which form a part of their bodies and are adapted for engagement by the end walls 76 of channels formed in the arms 59. However, upon the arms being moved towards each other the outer edges of the knife bodies will be engaged by the inner edges of the arms, which will act as cams to swing the same inwardly. The knife 43 will likewise be actuated upon this movement of the arms occurring, incident to the fact that its body is extended as at 77 to rockingly encircle the pivot 60 of one of the arms 59, the opposite end of its body being pivotally attached, by means of a link 78, to the second arm. Consequently, upon movement of these arms, and particularly the latter, this knife will be thrown towards the band unit, and upon the continuation of this movement will pass through the plane normally occupied by the bands adjacent the point 33' of their attachment.

During these movements of the parts, which in the present instance occur while the handles 23' are being swung downwardly, the bands will not be fed. However, as the handles are permitted to move upwardly the levers 45 will be rocked, incident to the fact that the ends of these levers, which extend beyond the head for this purpose, will be engaged and moved by the outer edge of the links 67. Consequently, the band unit will be fed downwardly, and it will be appreciated that in order to assist in this downward feeding the pawl 58 will act simultaneously with the pawls 44. This action will occur incident to the fact that the shaft 54 is connected to one of the arms 59 by means of a pin 79 and link 80. Thus, as the arm with which this pin is associated moves from the position shown in Fig. 6 to that shown in Fig. 4 the shaft 54 will be rocked in order to cause the pawl member 58 to move the band unit downwardly to a position at which the lowest band will project beyond the cutting edges of the cup 36.

It will be understood that in operation a band unit is introduced into the slot 35, and that the bottle with the cap extending over the mouth of the same, as in dotted lines in Fig. 3, is positioned upon the platform 20, this positioning being facilitated by means of the guides afforded by the pins 22 or yoke member 22'. This positioning of the band unit may be effected without injury to the same by preferably associating a spring-pressed rest 81 with the head and in line with the lower edge of the bands. It will also be understood that in thus "loading" the machine the lowermost band is brought to extend below the lower edge of the cup 36, so that the cutting edges of the latter and the cutting edges of the knives may cooperate to sever the portions 32' and 33' of the bands in a manner hereinafter more clearly brought out.

At this time it will be appreciated that it is only necessary to thus position the bottle if a platform type of machine is employed. Obviously, the most essential part of the present invention is that embraced in the head, and this head might be associated with any desired type of machine in which it would, for example, not be necessary to remove the bottles from a case or rack, it being furthermore appreciated that in lieu of the handles 23' and arms 23 any desirable manually- or power-actuated means might be employed for operating the head mechanism.

In any event, the head will be moved downwardly relatively to the bottle neck, and the latter will assume a position such as that shown in Fig. 3. In this position the stopper portion of the cap will be firmly pressed into the mouth of the bottle, and in the present instance the platform 20 will act to prevent any breakage of the bottle, incident to faulty adjustment of the mechanism or inequalities in the length of the receptacles which are being sealed. The parts of the mechanism are preferably so proportioned and arranged that no operation of the cutters, i. e., the knives, or the pawls will occur during the initial moving of the head into operative proximity with the cap which is to be secured in position upon the bottle. When, however, the head has reached its approximate limit of movement the arms 59 will begin to swing inwardly so as to engage the ends of the lowermost band and begin to constrict the same. During the foregoing operation of the parts, as has been indicated in dotted and full lines in Fig. 4, the band unit will be spaced from, and concentric relatively to, the hood or skirt 28 of the cap, and the latter will in turn be spaced from, and disposed concentrically relatively to, the bottle neck 29. As soon as the arms 59 begin their initial movement the knives 41 and 42 will be thrust inwardly, as in Fig. 5, to sever the lowermost band adjacent its forward ends from the band stack or unit, and this band will now begin to assume a somewhat elliptical shape and constrict the hood of the cap.

In order to prevent a bunching of the cap skirt between the still separated ends of the band a presser-foot is employed. This member, which in the present instance is in the nature of a plate 82, is slidably carried by the machine head and is formed with grooves 83 in its forward edge in order not to interfere with the movements of the arms 59. In order to project and retract the plate 82 a link 84 may be employed, which has one of its ends connected with one of the actuating members 68, its opposite end being formed with a slot, within and adjacent the outer end of which a pin secured to the presser-foot lies. A further pin attached to the head also rides within this slot, and thus it is obvious that as the actuating members draw the arms 59 toward each other the link will rock to project the presser-foot toward the plane of the receptacle neck.

Figure 5:
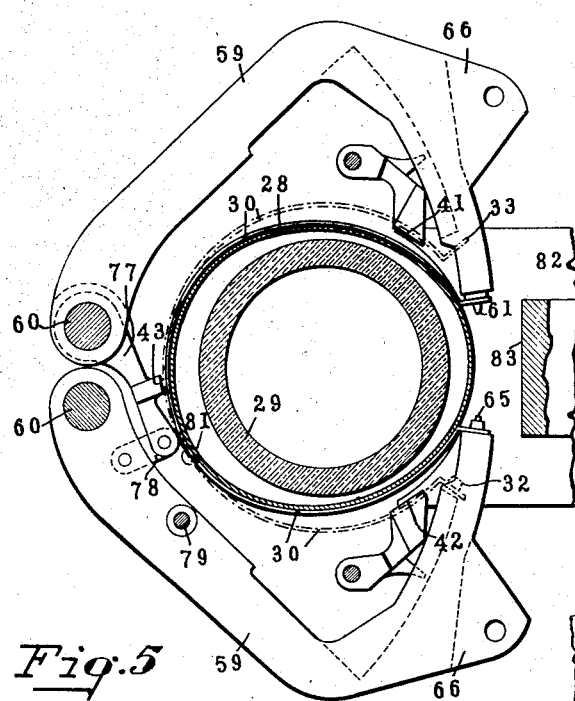
Fig. 5 is a view similar to Fig. 4, but showing the mechanism of the machine in partly thrown position.
Figure 6:
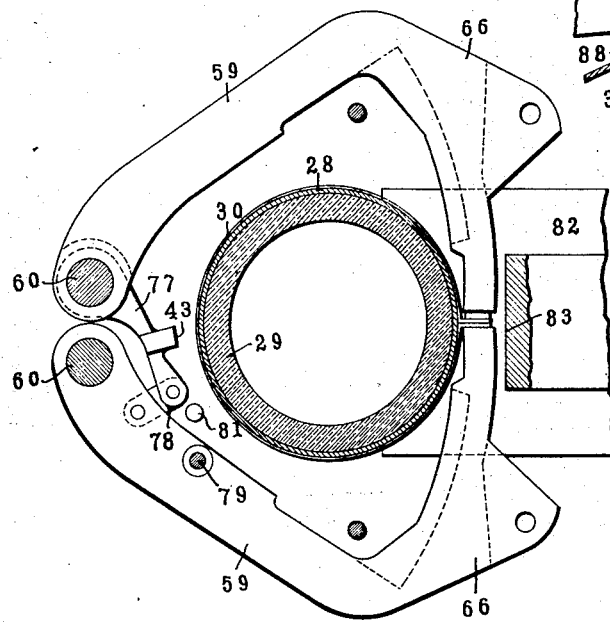
Fig. 6 is a view corresponding to Fig. 5, but showing the mechanism completely thrown.

Thus, upon continued inward movement of the arms the skirt will be uniformly constricted, and upon the parts moving to a position slightly beyond that indicated in Fig. 5 the connecting portion 33' between the band which is being applied and the remainder of the band unit will be severed by the knife 43, so that the parts may assume the position shown in Fig. 6, and the ends of the band may be anchored together, as in Fig. 11. At this time it will be understood that during the final stages of movement of the band ends toward each other the corrugations, which in the present instance provide the elastic or extensible band portions, will be stretched, and thus, regardless of inequalities in bottle necks or other receptacle portions, the bands will be uniformly applied to efficiently seal the receptacle mouth and retain the cap in locked position thereof. If it is found that the constriction of the band necessitates such a great amount of force that the band ends, and particularly the end presenting the opening 33, tends to straighten, this difficulty may be overcome—as has been indicated in Fig. 11—by simply forming the band with an opening 87, which is engageable by a tooth 88 forming a part of one of the arms 59. Consequently, instead of the force being exerted entirely on the band end, the greatest amount of the same will be transmitted by way of a direct pull upon the band body, incident to the construction above suggested; and, due to the fact that the tooth 88 has its rear face beveled the parts will obviously readily detach upon the arms being released.

During the return of the parts to their normal position, in which movement they will be facilitated by means of the various springs provided for this purpose, the pawl members 44 and 58 will be actuated to feed the band unit downwardly, and the pawl members 52 and 57 will prevent any return movement of such unit. The machine may now be applied to a subsequent receptacle, or vice versa, and the parts will be in such position that the entire operation may be repeated. It will be appreciated that as the band ends are drawn towards each other the skirt or hood of the cap will be uniformly constricted and a slight downward pull will be exerted upon the same, which pull will be transmitted throughout the body of the cap, and in the case of this body including a stopper portion the latter will be expanded into sealing contact with the lip or mouth of the receptacle, it being noted that a rising of the stopper is precluded by means of the plug 38.

In review: The bottle neck, cap skirt and band unit will initially present concentric and spaced members. Subsequently, the lowermost band of the unit will have its ends drawn towards each other and be separated adjacent these ends from the sheet of metal of which it forms a part, and this band will now be eccentrically disposed relatively to the cap skirt and bottle neck, it being appreciated that its body, however, will still be supported by virtue of the connecting portion 33'. Thereafter, the band will bear upon the cap skirt, so that the latter will also begin to assume an eccentric position, after which the final point of attachment between the band which is being constricted and the band unit will be severed. It will be understood that at this stage of the operation the frictional contact between this band and the skirt and the manner in which the former is gripped by the operating mechanism will be sufficient to adequately insure against any accidental displacement of the band, and upon continued constriction of the latter, the skirt and band will again assume a position concentric with respect to the bottle neck. Only after the parts have been sealed, and the cutting mechanism moved back to its normal and retracted position, will the feeding mechanism act to move the band unit to dispose the next lowermost band of the same in operative position, it being thus understood that any interference between this downward movement and the mechanism carried by the head will be precluded.

Finally, with reference to the mechanism shown in Fig. 12, it will be understood that, if desired, the inner ends of the arms 23, instead of being extended to provide cam portions, might readily be mounted upon a shaft 85, which carries ears 86 acting as cams upon the rollers 71 in order to operate the latter.

From the foregoing it will be appreciated that the objects of this invention have been accomplished, and since certain changes may be made in the above construction, and different embodiments of the invention could be made, without departing from the scope thereof, it is intended that all matter contained in the above description, or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. A machine for applying a band to a rigid receptacle neck, said band being previously formed and cut substantially to length, said machine including means engaging the two ends of said band and pressing the same toward each other, and means for interlocking such ends solely by directly contacting and merging integral end portions with each other.

2. A machine of the class described, including a pair of constricting members movable towards each other, means on said members engaging the ends of a previously-formed metallic band cut approximately to length, said band being split and having its ends separated, its body encircling the skirt of a cap applied to a receptacle, the skirt of said cap being initially spaced from the neck of said receptacle, and means for operating said members to draw said skirt into contact with the receptacle neck, said members comprising a pair of arms pivoted at a point opposite to the split portion of said band and being generally arcuate in shape, whereby they are spaced from said skirt during the constriction thereof.

3. A machine for securing a skirted cap on a receptacle neck, and adapted for use in connection with band units comprising a plurality of laterally disposed bands connected along their sides, said machine including means for positioning the outermost of said bands adjacent said skirt, means for separating said outermost band from said unit, and means for securing the separated band about said skirt and the neck of the receptacle.

4. A machine for securing a skirted cap on a receptacle neck, said machine including means for bodily moving a plurality of bands connected at a number of different points, means for detaching one of said bands, and means for independently applying and securing the detached band about said skirt and the receptacle neck.

5. A machine adapted to apply a previously formed split sealing ring or band about the neck of a receptacle having an enlarged lip portion, said machine including means for bodily moving said band downwardly over said lip with the ends of said band separated to an extent sufficient to allow for clearance between said lip and band, means for subsequently drawing the ends of said band towards each other to constrict the diameter of the same to substantially correspond to the diameter of the bottle neck, and means forming a part of said machine for causing said band to be locked in such position.

6. A machine of the class described, including means for successively detaching individual bands from a unit comprising a plurality of bands, each connected to another at a number of different points, said means initially severing the points of attachment which exist adjacent the band ends, means for constricting said band, said detaching means subsequently severing said band from said unit at a point of attachment remote from said band ends, and means forming a part of said machine for interlocking the band end portions.

7. A machine of the class described, including means for disposing a split band concentrically with respect to and spaced from the neck of a receptacle, which latter has applied to it a skirted cap, the skirt of which is spaced from and concentrically disposed with respect thereto, means for moving the band ends toward each other to dispose said band and skirt into an eccentric position with respect to the receptacle neck, means for maintaining another portion of said band in substantially fixed position with respect to said receptacle neck during said movement of the band ends, means for releasing said other portion of said band whereby it moves toward said receptacle neck during the continued constriction of said band, the end portions of said band being brought adjacent each other with the skirt and said body concentrically disposed relatively to the receptacle neck, with the skirt-portion intimately engaging the receptacle neck, and means for interlocking said band adjacent its ends.

8. A machine for use in connection with a receptacle to be sealed and a band unit including a plurality of bands connected to each other at a number of different points, said machine including means for constricting the body of one of said bands, means for detaching it from others of the same at certain of said points of connection, means for operating during the constriction for completing the severance of said band from the others of the unit.

9. A machine of the class described, for use in connection with a receptacle to be sealed and a band unit including a plurality of bands connected to each other at a number of different points, said machine including means for constricting the body of one of said bands and detaching it from others of the same at one or more of said points of connection, means operating during the constriction for completing the severance of said band from the others of the unit, each of said bands presenting initially separated end portions, and means for finally interlocking said end portions.

10. A machine for use in connection with a band unit comprising a plurality of split bands, each having offset ends and each being connected to the others throughout portions of their lengths, said machine including means for drawing the ends of one of said bands toward each other, means for severing the points of connection extant between said band and said unit, and means for interlocking said band adjacent its ends.

11. A machine for use with a split metal securing band and a cap having a depending skirt initially spaced from the neck of a receptacle, said machine including means operating against said skirt for holding the same against the neck of the receptacle adjacent the split of said band, means operative during said holding for constricting said band and said skirt and moving the latter into intimate contact with said receptacle with all portions thereof in immediate proximity thereto.

12. A machine for use in connection with a receptacle the mouth of which is covered by a cap having a depending skirt encircling the pouring lip and neck thereof, and to which skirt a band is to be applied to draw the same into intimate contact with said neck, said band before application to the cap skirt having its ends separated, and the band body being arcuate and of a diameter greater than the receptacle pouring lip, said machine including means for bodily moving said band past said pouring lip axially of said receptacle and to a point adjacent the receptacle neck, and means engaging the band adjacent the ends thereof and drawing said ends toward each other and for interlocking the same.

13. A machine for use in connection with a receptacle the mouth of which is covered by a cap having a depending skirt encircling the pouring lip and neck thereof, and to which skirt a band is to be applied to draw the same into intimate contact with said neck, said band before application to the cap skirt having its ends separated, said band being the outermost of a series, each attached to an adjacent band at its inner side edge at points in proximity to and substantially intermediate its ends, said machine including means for separating the band adjacent its ends from the remainder of the bands, means for moving the ends of the outermost band toward each other and interlocking the same, means for severing the band from said unit at the point of attachment which is intermediate the ends thereof, and means for bodily feeding said band unit to a position at which the outermost band thereof is at a point adjacent the parts of the machine adapted to cooperate therewith.

14. A machine for use in connection with a receptacle the mouth of which is covered by a cap having a depending skirt encircling the pouring lip and neck thereof, and to which skirt a band is to be applied to draw the same into intimate contact with said neck, said band before application to the cap skirt having its ends separated, said band being the outermost of a series, each attached to an adjacent band at its inner side edge, said machine including means for separating said band from the remainder of the bands, means for moving the ends of the outermost band toward each other and interlocking the same, and means for bodily feeding said band unit to a position at which the succeeding outermost band thereof is at a point adjacent the parts of the machine adapted to cooperate therewith.

15. A machine for use in connection with a receptacle the mouth of which is covered by a cap having a depending skirt encircling the pouring lip and neck thereof, and to which skirt a band is to be applied to draw the same into intimate contact with said neck, said band before application to the cap skirt having its ends separated, said band being the outermost of a series, each attached to an adjacent band at its inner side edge at a point intermediate its ends, said machine including means for moving the ends of the outermost band toward each other, means for separating said band from the remainder of the bands, means for interlocking the band ends, and means for bodily feeding said unit to a position at which the succeeding outermost band thereof is at a point adjacent the parts of the machine adapted to cooperate therewith.

16. A machine for use in connection with a receptacle the mouth of which is covered by a cap having a depending skirt encircling the pouring lip and neck thereof, and to which skirt a band is to be applied to draw the same into intimate contact with said neck, said band before application to the cap skirt having its ends separated, said band being the outermost of a series, each attached to an adjacent band at its inner side edge, said machine including means for moving the ends of such band toward each other and interlocking the same, means for separating the band from said series during said movement, and means for bodily feeding said unit to a position at which the succeeding outermost band thereof is at a point adjacent the parts of the machine adapted to cooperate therewith.

17. A device of the class described for use in connection with a previously formed split band the ends of which are offset, one being formed with an opening and the other having a stud to enter such opening, including, in combination, means for engaging said offset end, means for operating said engaging means and thereafter to move the band ends toward each other with the stud of one aligned with the opening of the other, the former passing through the latter during the continuation of said movement, and means for subsequently deforming said stud to prevent a separation of said band ends.

18. A device of the class described for use in connection with a previously formed split band the ends of which are offset, one being formed with an opening and the other having a stud to enter such opening, including, in combination, means for engaging said offset end, means for operating said engaging means and thereafter to move the band ends toward each other with the stud of one aligned with the opening of the other, the former passing through the latter during the continuation of said movement, and means for subsequently bending said stud to extend in a direction substantially at right angles to the line of separation pull of the band ends to prevent such separation.

19. A device of the class described for use in connection with a previously formed split band the ends of which are offset, one being formed with an opening and the other having a stud to enter such opening, including, in combination, means for engaging said offset end, means for operating said engaging means and thereafter to move the band ends toward each other with the stud of one aligned with the opening of the other, the former passing through the latter during the continuation of said movement, and means acting upon said stud to bend the outer end of the same to extend in contact with the rear face of the opposite end-portion of the band to prevent a separation of said ends.

20. A sealing machine for applying a band having end portions, one formed with an opening, the other to pass through said opening, said machine comprising a head including a pair of rockingly mounted arms, means connecting said arms with the band adjacent the ends thereof, means for swinging said arms to move the band ends toward each other with the band-end and opening aligned, the former passing through the latter during the continuation of such movement, and means for subsequently deforming said end to prevent a separation of said band ends.

21. A machine for applying a band having end portions, one formed with an opening and a stud associated with the opposite end for passage through said opening, said machine comprising a head including a pair of swinging arms, projecting elements at the outer ends of said arms, one of said elements extending through the opening in the end of a band, the other extending into the stud formed in the opposite end of the band, means for moving said arms toward each other to pass said stud through said opening, and means associated with said arm elements for deforming said stud to prevent a subsequent separation of the band ends.

22. A machine of the class described, comprising a head including means for engaging a band adjacent the ends thereof, said band being the outermost of a series, each attached to the other at points adjacent their inner side edges, means for operating said band-engaging means to move the band ends toward each other and interlock the same, and separating means actuated by said last-named means to detach the outermost band from said series.

23. A machine of the class described, comprising a head including means for engaging a band adjacent the ends thereof and which band is the outermost of a series, each attached to an adjacent band at a number of points along its inner side edge, means for operating said band-engaging means to move the band ends toward each other and interlock the same, and a plurality of shearing means actuated by said last-named means and operating to successively sever the points of attachment thereof to said series during the operation of said band-engaging means.

24. A machine of the class described, comprising a head including means for engaging a band adjacent the ends thereof, which band is the outermost of a series of superposed bands, means for operating said band-engaging means to move the band ends toward each other and interlock the same, means for retaining said band against other than constrictive movement during said operation, and means acting subsequently to the interlocking of said band ends to bodily move the succeeding band of the series into operable position.

25. A machine of the class described, comprising a head including means for engaging a band adjacent the ends thereof, which band is the outermost of a series of superposed bands, means for operating said band-engaging means to move the band ends toward each other and interlock the same, a pawl preventing axial movement of said band with respect to said head during such operation, a further pawl for feeding the next succeeding band of the series into operative position subsequently to the interlocking of the ends of said preceding band, and means for operating said last-named pawl.

26. A machine of the class described, comprising a head formed with an arcuate opening, means adjacent said head and cooperating with arcuate bands which are moved through said opening and axially of a receptacle, to the neck of which one is to be applied, means for drawing the ends of the same toward each other and adjacent the outer face of the receptacle, means for interlocking the band ends, and means for feeding a further band through said opening.

27. A machine of the class described, comprising a head having an arcuate slot to receive a unit of arcuate connected bands, which unit is to be moved axially of a receptacle to the neck of which one of the bands is to be applied, means below said slot cooperating with one of said bands to move the ends thereof toward each other and interlock the same, and means extending adjacent said slot and operating to separate the band which is being constricted from the remainder of said band unit.

28. A machine of the class described, comprising a head including a member presenting a cutting edge, past which a unit including a plurality of bands connected to each other at their side edges is to be moved, the ends of each band of said unit being separated, means cooperating with the outermost band of the series for moving the ends of the same toward each other to constrict said band and cause the same to encircle the neck of a receptacle, means for interlocking such ends, and means cooperating with said cutting edge to sever the point of attachment of the outermost band from said unit.

29. A device of the class described adapted for use with a unit comprising a plurality of laterally disposed split bands connected together including, in combination, a pair of swinging arms, elements associated with the outer ends of the same, adapted to engage the ends of the feed band on said unit and separating elements associated with said arms, and actuated to sever the first band from the unit when said arms are swung in one direction.

30. A machine of the class described, including, in combination, a pair of swinging arms, band-engaging elements associated with the outer ends of the same, means for actuating said arms, and means for bodily feeding a band axially with respect to a receptacle the neck of which is to be encircled by the band, said last-named means being operated by said arm-actuating means.

31. A machine of the class described, including, in combination, a head, a pair of arms associated with said head, means associated with said arms at the outer ends of the same for interlocking the ends of the band, means associated with one of said arms at a point short of the end thereof for engaging the band body at a like point, and means for moving said arms toward each other to bring the ends of the band to a position at which they may be interlocked.

32. A machine of the class described, including in combination, a head providing a cup, a plate having portions of its body spaced from the side walls of said cup to provide a slot therebetween, pawls working adjacent said slot to feed bands through the same, a pair of arms mounted for movement below said cup, band-end-engaging elements associated with said arms, means for actuating said pawls and arms to feed a band to a position at which it may be engaged by said arms and to move the ends of said band toward each other, and means associated with said arms for interlocking the ends of said band.

33. A machine of the class described, including, in combination, a head providing a cup, a plate having portions of its body spaced from the side walls of said cup to provide a slot therebetween, pawls working adjacent said slot to feed bands through the same, a pair of arms mounted for movement below said cup, band-end-engaging elements associated with said arms, means for actuating said pawls and arms to feed a band to a position at which it may be engaged by said arms and to move the ends of said band toward each other, means associated with said arms for interlocking the ends of said band, and a knife cooperating with the lower edge of said cup to shear the outermost band of a connected series from the remainder thereof.

34. A machine of the class described, including, in combination, a base and a resiliently disposed sub-base for receiving a receptacle to be sealed, a head above said base, means for moving said head axially of a receptacle placed upon said base, cap-engaging and band-sealing means associated with said head, and guide members positioned on said base and extending upwardly past said sub-base to assist in the positioning of a receptacle upon the latter in predetermined and proper relationship with respect to said head.

35. A machine of the class described, including, in combination, a pair of movable arms, band-end-interlocking means associated with the inner ends of the arms, means for operating said arms to move the ends of a band toward each other and into contact with the skirt of a cap, and means acting subsequently to press that portion of the cap skirt which is between the separated band ends into contact with the receptacle which is to be sealed and retaining said skirt in such position until the ends of such band are interlocked.

36. A receptacle-sealing machine for use in connection with caps having deformable skirt portions, said machine including a head to enclose the upper end of and to bear against said cap for retaining the same in position on a receptacle, means for positioning a split band adjacent said skirt portion and partially surrounding the same, means movable thereupon toward that portion of said skirt adjacent the split portion of said ring to move said portion of said skirt against the neck of said receptacle and to hold it there, and means associated with said head for thereupon bringing together and fastening the ends of said split ring.

37. A milk bottle sealing machine for use in connection with paper caps having skirt portions, said machine including a head to enclose the upper end of and bear against said cap for retaining the same in position on a receptacle, means for positioning a split band adjacent said skirt portion and partially around the same, said band being previously formed and cut approximately to length with a deformed portion reducing its effective length, means movable toward said head adjacent the split portion of said band to force the adjacent portion of said skirt against the neck of said receptacle, and means associated with said head for thereafter stretching said band and bringing together and fastening the ends thereof, whereby said skirt is drawn closely adjacent said neck substantially throughout.

38. A receptacle-sealing machine for use in connection with caps having deformable skirt portions, said machine including means for holding the cap on the upper end of said receptacle, means acting against and holding a portion of said deformable skirt adjacent said receptacle, means for positioning a metal band against another portion of said deformable skirt, said band having a deformed portion to shorten its effective length, means for drawing the band together over the first-mentionel part of said deformable skirt while the same is held by said second mentioned means and simultaneously permanently stretching said band to increase its length, and means for connecting said band over said last-mentioned part.

39. A receptacle-sealing machine for use in connection with caps having deformed skirt-portions, said machine including means for holding the cap on the upper end of said receptacle, means for positioning a split metal band against a portion of the deformable skirt, said band being preformed and cut approximately to length and having a deformed portion reducing its effective length, means for engaging the ends of the band and drawing the same together around said skirt and simultaneously permanently stretching said band to increase its length, means for thereafter fastening the ends of said band together, and means acting against the portion of said skirt between the ends of said band for preventing said portion from interfering with the said drawing and fastening actions.

40. A machine for securing caps having deformed skirt-portions to receptacles such as milk bottles or the like, said machine including means for holding the cap on the upper end of the receptacle, means for positioning a split metal band against a portion of the deformable skirt, said band being preformed and cut to a length slightly greater than the circumference of the skirt portion when finally applied to the neck of the receptacle and being deformed to reduce its effective length to slightly less than said circumference, means for engaging the ends of the band and drawing the same together around said skirt and simultaneously permanently stretching said band to increase its length, means for fastening the ends of said band together, and means acting against said skirt for preventing said skirt from protruding between the ends of said band and interfering with the said drawing and fastening actions.

41. A machine of the class described, comprising, in combination, means for engaging a sealing element adjacent one end thereof, means for engaging the sealing element adjacent its other end and for drawing said end toward and interlocking it with said first mentioned end, said last mentioned means comprising a pivoted arm.

42. A machine for applying skirted caps to milk bottles, said machine including, in combination, a head operable to hold said cap in place on the mouth of the bottle, means associated with said head for engaging one end of the sealing element to be positioned around the skirt of said cap, means for engaging the other end of said sealing element and for forcing it toward said first mentioned end and interlocking it therewith; said last mentioned means comprising an arcuately shaped pivoted arm, the pivot of which is at least partially opposed circumferentially to the position of the interlock of the sealing element with respect to the bottle neck.

43. A machine adapted to apply a skirted cap to the rigid neck of a receptacle and to retain said cap thereon by a sealing member adapted to have its end portions coupled against movement solely by directly contacting and merging integral member portions, and which seal requires a subsequent destructive separation of such end portions to effect an opening of the seal, said machine comprising means to support the receptacle, means for pressing the cap into contact therewith, means for applying and drawing said sealing member into contact with the cap skirt to constrict the latter into intimate engagement with the receptacle neck, and means for merging the end portions of said member into permanent union with the skirt retained thereby in a condition of substantially maximum constriction.

44. A machine adapted to apply a skirted cap to the rigid neck of a receptacle and to retain said cap thereon by a sealing member originating from a source of supply and which sealing member is adapted to have its end portions coupled solely by directly contacting and merging integral member portions, thereby requiring a subsequent destructive separation thereof to effect an opening of the seal, said machine comprising means to support the receptacle, means for pressing the cap into contact therewith, means for feeding a sealing member from said source of supply to a position adjacent the skirt of said cap, means for drawing said sealing member into contact with the cap skirt to constrict the latter into intimate engagement with the receptacle neck, means for severing the sealing member from the supply, and means for merging the end portions of said member into permanent union with the cap skirt retained thereby in a condition of substantially maximum constriction.

45. A machine adapted to apply a skirted cap to the rigid neck of a receptacle and to retain said cap thereon by a sealing member originating from a source of supply and which sealing member is adapted to have its end portions coupled solely by directly contacting and merging integral member portions, thereby requiring a subsequent destructive separation thereof to effect an opening of the seal, said machine comprising means to support the receptacle, means for pressing the cap into contact therewith, means for feeding a sealing member from said source of supply to a position adjacent the skirt of said cap, means for drawing said sealing member into contact with the cap skirt to constrict the latter into intimate engagement with the receptacle neck, means for assuring a substantially even distribution of the skirt material during such constriction, means for severing the sealing member from the supply, and means for merging the end portions of said member into permanent union, with the cap skirt retained thereby in a condition of substantially maximum constriction.

46. A machine for capping a receptacle by applying to the neck thereof a skirted cap having an integral stopper portion to enter the neck bore with the skirt extending around the neck exterior, and in retaining said cap upon said receptacle by a sealing member which is adapted to have portions adjacent its ends locked against relative movements so that a subsequent destructive removal of such member is necessary to effect an opening of the seal, said machine comprising means to support the receptacle, means entering the stopper portion of said cap to force the same into the bore, means for retaining the cap against movement with respect to said receptacle, means for constricting the cap skirt into intimate engagement with the receptacle by encircling the same with a sealing member, and means for permanently uniting portions adjacent the ends of said member with the skirt retained thereby in a condition of substantially maximum constriction.

47. A machine for capping a receptacle by applying to the neck thereof a skirted cap having an integral stopper portion to enter the neck bore with the skirt extending around the neck exterior, and in retaining said cap upon said receptacle by a sealing member, originating from a source of supply, and which sealing member is adapted to have its end portions coupled solely by directly contacting and merging integral member portions, thereby requiring a subsequent destructive separation thereof to effect an opening of the seal, said machine comprising means to support the receptacle, means bearing within the stopper portion of said cap to force the latter into the receptacle bore, means for feeding a sealing member from said source of supply to a position adjacent the skirt of said cap, means for drawing said sealing member into contact with the cap skirt to constrict the latter into engagement with the receptacle neck, and to draw the other cap portions into contact with the receptacle surfaces adjacent thereto, means for severing the sealing member from the supply, and means for merging the end portions of said member into permanent union, with the cap parts retained in substantially maximum sealing contact with the receptacle surfaces.

48. A cap and sealing machine, comprising a movable head, means providing a support for a supply of cap sealing means, means for shifting said head relatively to a receptacle to be sealed to cause a cap to be pressed into contact therewith, means acting thereafter to apply said sealing means to said cap to retain the latter in association with said receptacle, and means for shifting said last-named means to clear said sealing means, cap and receptacle prior to further shifting of said head relatively to said receptacle to free the latter.

In testimony whereof I affix my signature.

WILLIAM H. KNOWLES.